| United States Patent [19] | [11] | 4,071,676 |
|---|---|---|
| Werner et al. | [45] | Jan. 31, 1978 |

[54] HYDROCARBON RESINS

[75] Inventors: Gerhard Werner, Glashutten; Peter Gräfe, Geisenheim-Marienthal; Richard Sattelmeyer, Schlangenbad-Georgenborn; Heinz Schmelzer, Rummelsheim, all of Germany

[73] Assignee: Hoechst Aktiengesellschaft, Frankfurt am Main, Germany

[21] Appl. No.: 686,086

[22] Filed: May 13, 1976

[30] Foreign Application Priority Data

May 17, 1975 Germany .............................. 2522080

[51] Int. Cl.² .......................................... C08F 232/06
[52] U.S. Cl. ..................................... 526/283; 526/19; 526/25
[58] Field of Search ................................. 526/283, 25

[56] References Cited

U.S. PATENT DOCUMENTS

| 2,319,271 | 5/1943 | Soday | 526/25 |
|---|---|---|---|
| 3,000,866 | 9/1961 | Tarney | 626/283 |
| 3,166,517 | 1/1965 | Ro | 526/283 |
| 3,725,326 | 4/1973 | Solomon | 526/283 |
| 3,966,690 | 6/1976 | Mathews | 526/283 |

Primary Examiner—Paul R. Michl
Attorney, Agent, or Firm—Hammond & Littell

[57] ABSTRACT

A process for the preparation of a hydrocarbon resin which comprises polymerizing a mixture of (a) from 30 to 90% by weight of a dicyclopentadiene component comprising dicyclopentadiene and up to 30% by weight of an at most dialkylated dicyclopentadiene having from 1 to 4 carbon atoms in each alkyl substituent and (b) from 10 to 70% by weight of an aliphatic olefin containing 8 carbon atoms in the presence of a Friedel-Crafts catalyst and a solvent at a temperature of from 30° to 140° C wherein the polymer obtained is isolated as such or subsequently hydrogenated, and hydrocarbon resins prepared according to said process.

15 Claims, No Drawings

HYDROCARBON RESINS

The invention relates to a process for the preparation of hydrocarbon resins and to the new hydrocarbon resins thereby produced.

Large quantities of dicyclopentadiene are formed when petroleum is cracked. Polymers prepared therefrom by cationic polymerization processes have not hitherto been susceptible to technical application due to their limited solubility in organic solvents.

Experiment has shown that polymers of dicyclopentadiene which are soluble in aromatic hydrocarbons can be obtained by cationic polymerization of dicyclopentadiene in the presence of toluene and of aluminium chloride at 50° to 60° C. However, these polymers have only limited compatibility with aliphatic solvents e.g. petroleum and are therefore not suitable for petroleum containing contact adhesives. They are also unsuitable for other adhesive resin systems, owing to their poor adhesion and poor resistance to peeling. Hydrogenation of these resins yields only a slight improvement in the technical adhesion qualities.

It has been proposed to polymerise dicyclopentadiene in ethyl bromide in the presence of boron trifluoride at 30° C. These products are soluble in aromatic solvents but not in aliphatic hydrocarbons.

Moreover, copolymers of piperylene and diisobutylene have been prepared in the presence of metal halide Friedel-Crafts catalysts and of solvents. Piperylene occurs in $C_5$ petroleum fractions, but production on an industrial scale is only economically worthwhile if a use can be found for the isoprene which is obtained simultaneously. In any event production of this kind requires a high technical expenditure.

On the other hand, good technical results are obtained with thermally polymerized hydrocarbon resins. However, attempts to copolymerize dicyclopentadiene and diisobutylene thermally have hitherto been unsuccessful.

According to the present invention there is provided a process for the preparation of a hydrocarbon resin which comprises polymerising a mixture of (a) from 30 to 90%, preferably from 40 to 80% by weight of a dicyclopentadiene component comprising dicyclopentadiene and up to 30% by weight of a mono- or dialkylated dicyclopentadiene having from 1 to 4 carbon atoms in each alkyl substituent and (b) from 10 to 70%, preferably from 20 to 60% by weight of an aliphatic olefin containing 8 carbon atoms, in the presence of a Friedel-Crafts catalyst and a solvent at a temperature of from 30° to 140° C, preferably from 60° to 100° c.

If desired the resin obtained may be subsequently hydrogenated, conveniently in conventional fashion.

In general the hydrocarbon resins obtains are readily soluble in organic solvents and have surprisingly good adhesion properties.

Typical $C_8$ olefins which may be used as component (a) of the starting mixture include, for example, 2, 4, 4-trimethylpent-1-ene and 2, 4, 4-trimethylpent-2-ene. Technical mixtures of these two compounds obtainable under the name diisobutylene, e.g. mixtures of from 65 to 90% by weight of 2,4,4-trimethylpent-1-ene and 35 to 10% by weight of 2,4,4-trimethylpent-2-ene are however preferred. Other octene isomers and isomer mixtures may also be used, for example, those prepared by dimerisation of $C_4$ olefins. The following are examples: 2,3,3-, 2,3,4- and 3,3,4-trimethylpent-1-enes, 2,3,4- and 3,4,4-trimethylpent-2-enes, 2,3-, 3,4- and 5,5-dimethylhex-2-enes, 2,3-dimethylhex-3-ene and 3,4-dimethylhex-1-ene. Since there are no special requirements from the point of view of their degree of purity, commercial grade products can readily be used. These $C_8$ olefins are advantageously used in amounts of from 30 to 50% by weight, based on the entire monomer mixture.

With regard to quality, the same considerations apply to dicyclopentadiene component (a), which is advantageously used in amounts of from 50 to 70% by weight, based on total monomer content. Pure or commercial grade dicyclopentadiene and its aforesaid mono- and dialkylated derivatives, e.g. its mono- and dimethylated derivatives, may be used.

Typical Friedel-Crafts catalysts which may be used are, for example, $AlBr_3$, $SnCl_4$, $BF_3$ and $BF_3$ adducts, e.g. etherates and ester, acetic acid and phenol adducts, preferred catalysts being $AlCl_3$ and boron trifluoride etherates, the latter particularly when polymers with low molecular weights and low melting points are desired. The quantity of catalyst used is generally from 0.5 to 6%, preferably 1.5 to 4% by weight, based on the weight of the monomer mixture.

The water content of the solvent used should advantageously be less than 0.1% by weight, but in other respects the quality of commercial grade solvents is adequate. The following solvents may for example be used: aromatic hydrocarbons, e.g benzene, xylene and preferably toluene, liquid halogenated, e.g. chlorinated, hydrocarbons with 1 to 6 carbon atoms, e.g. methylene chloride, 1,2-dichloropropane and monochlorobenzene, and aliphatic hydrocarbons containing 5 to 14 carbon atoms, preferably up to 10 carbon atoms, e.g. heptane and petroleum. However, lower yields are generally obtained using aliphatic hydrocarbons than when aromatic hydrocarbons are used, the yield with aromatic hydrocarbons being generally at least 85%. The solvents are generally used in quantities of 20 to 140%, preferably 50 to 100% by weight, referred to the weight of the monomer mixture. Preferably, the solvents are put in to the reaction vessel first. However, it is also possible to mix the monomers with some of the solvent and then to dilute the mixture with the remaining solvent.

Polymerization is conveniently carried out under a substance which, under the reaction conditions, forms a protective gas atmosphere, e.g. under nitrogen or carbon dioxide, and may be carried out under normal or excess pressure. In a preferred method of carrying out the process, the catalyst and the solvent are put in to the reaction vessel first, the reaction vessel is filled with protective gas, the mixture is brought to the desired reaction temperature and the monomer mixture is then added, with stirring and cooling, at such a rate that the temperature of the mixture remains unchanged. However, the catalyst may if desired be added continuously or in portions during the addition of monomers.

The addition of the monomer mixture generally takes from 1 to 5 hours, depending on the reaction temperature, the intensity of cooling and quantity of reaction mixture. The mixture is kept at the selected polymerization temperature, with stirring, for a further few hours to allow the reaction to proceed.

The reaction mixture obtained according to the invention, wherein the polymer is in solution, may be processed according to per se known methods. The catalyst may be removed, for example by hydrolysis in the presence of water, aqueous alkali or aqueous inorganic acid followed by subsequent washing out. Alternatively the catalyst may be removed by complex formation e.g. by introducing ammonia gas or adding aqueous ammonia solution, followed by separation, e.g. filtration.

The resin solution freed of catalyst is then appropriately worked up by distillation, e.g. at 200° C under normal pressure, whereby the majority of solvent and volatile components are removed first, followed by reduction of the pressure, e.g. to 10 to 100mm Hg, or blowing in water vapour until the components volatile in steam have been eliminated.

If the resins are subsequently hydrogenated, this step may be carried out in conventional manner, preferably at from 150° to 260° C under a hydrogen pressure of 50 to 300 atmospheres and in the presence of a solvent, preferably an aliphatic or cycloaliphatic hydrocarbon, e.g. heptane, cyclohexane or other saturated hydrocarbon in which the resin is soluble. A metallic hydrogenation catalyst e.g. nickel, palladium, cobalt, platinum, ruthenium or rhodium or an oxide thereof, is generally used, preferably, finely divided nickel or kieselguhr. After hydrogenation, the catalyst may be filtered off and the solvent removed by distillation.

The resins produced by the new process just described are also new and provide further features of the present invention. Thus according to the invention there are further provided: olefinically unsaturated hydrocarbon resins having a molecular weight of from 400 to 2000, a melting point of from 20° to 140° C (by the capillary method) and a viscosity of from 10 to 5000cP (as a 70% toluene solution at 20° C) and comprising (a) from 30 to 90%, preferably from 40 to 80% by weight of polymerised units of a dicyclopentadiene component comprising dicyclopentadiene and up to 30% by weight of a mono- or dialkylated dicyclopentadiene having from 1 to 4 carbon atoms in each alkyl substituent and (b) from 10 to 70%, preferably from 20 to 60% by weight of polymerised units of an aliphatic olefin containing 8 carbon atoms, and also corresponding hydrogenated hydrocarbon resins having a molecular weight of from 500 to 1500, a bromine number below 25, preferably below 10, a melting point of from 20° to 140° C (by the capillary method) and a viscosity of from 10 to 5000cP (as a 70% toluene solution at 20° C).

In general the unhydrogenated hydrocarbon resins according to the invention are soluble in aromatic hydrocarbons, e.g. benzene, toluene and xylene. Certain preferred resins, both hydrogenated or unhydrogenated, also show a good compatibility with aliphatic hydrocarbons, e.g. cyclohexane, heptane and petroleum with a boiling point in the range from 60° to 95° C. They are compatible with other natural and synthetic resins, for example, colophony, terpene resins, terpenephenol resins, various waxes, natural rubber and synthetic rubbers.

The hydrogenated hydrocarbons have more or less the same softening point and molecular weight as the unhydrogenated resins from which they are prepared. In general they are colourless and have outstanding long term adhesion properties and may be used as contact adhesives even without the addition of stabilizers.

The resins according to the invention may be used e.g. as binders for sealing compounds, in road marking materials, and in solvent and contact adhesives. They may replace natural and terpene resins in these adhesive systems. They are particularly suitable as heat adhesives and as adhesives for elastomers and impart good adhesion properties to contact adhesives produced therefrom. To improve the long term adhesion properties, anti-oxidants, e.g. 2,6-di-tert.butyl-4-methylphenol and di-tert.butyl-pyrocatechol, may also be admixed therewith. Combinations with up to 50%, preferably up to 30% by weight of commercial terpene-phenol resins have proved particularly effective as adhesive compositions. Addition of the resins according to the invention imparts good long-term tackiness and at the same time even the resistance to peeling, as determined by the PSTC-1 method (Pressure Sensitive + Tape Council), of the terpene phenol resins can be improved. Whilst previously known hydrogenated homopolymers of dicyclopentadiene have no tacky qualities, adhesive compositions containing the hydrogenated resins according to the invention, even those containing at least 20% by weight of $C_8$ olefins, have a surprisingly good adhesive activity. Their adhesion properties increase, like those containing the non-hydrogenated resins, as the $C_8$ olefin proportion in the resin increases. Owing to their good technical adhesion properties, copolymers with 30 to 50 parts by weight of $C_8$ olefins, especially, diisobutylene, are particularly preferred. Of special interest are adhesives based on natural and synthetic rubber containing from 40 to 120% by weight (referred to the rubber) of hydrocarbon resin according to the invention.

The following Examples illustrate the preparation of hydrocarbon resins according to the present invention:

EXAMPLES

COMPARISON EXAMPLE 1 AND EXAMPLES 2 TO 13

The amounts of starting materials, solvent and characteristic values of the products are given in Table 1 below. The process used in these Examples is as follows:

Aluminium chloride and the indicated quantity of solvent are placed, under a nitrogen atmosphere, in a three necked flask equipped with stirrer and thermometer and the mixture is heated to the desired temperature with stirring. The monomer mixture is then added over 1 hour. The mixture is left to react for a few hours more at the selected temperature. In order to precipitate the catalyst, 130 ml of a mixture of methanol and 25% aqueous ammonia in a volume ratio of 1:1 are added to the solution. The precipitate formed is filtered off and the solvent is then distilled off, finally in vacuo at 20 to 100 mm Hg. To remove low molecular components, steam distillation is in some instances required.

Table 1

| Example | Monomer in g DCPD* | Dii* | Solvent (in 1 kg quantities) | Catalyst in g | | Polymerisation temp °C | time h | Yield (% by weight) | M.p. 20°C | Visc. 20° C 70% in toluene, cP | Bromine Number | Compatibility with Petroleum 80/110 |
|---|---|---|---|---|---|---|---|---|---|---|---|---|
| 1 (comp) | 1000 | 0 | toluene | AlCl₃ | 30 | 80 | 3 | 98 | 125 | 4300 | 48 | — |
| 2 | 800 | 200 | " | " | 30 | 80 | 3 | 98 | 95 | 1856 | 49 | + |
| 3 | 700 | 300 | " | " | 30 | 80 | 3 | 97 | 77 | 752 | 66 | + |
| 4 | 600 | 400 | " | " | 30 | 80 | 3 | 97 | 64 | 815 | 66 | + |
| 5 | 500 | 500 | " | " | 30 | 80 | 3 | 96 | 35 | 128 | 68 | + |

Table 1-continued

| Example | Monomer in g DCPD* | Dii* | Solvent (in 1 kg quantities) | Catalyst in g | | Polymerisation temp °C | time h | Yield (% by weight) | M.p. 20°C | Visc. 20°C 70% in toluene, cP | Bromine Number | Compatbility with Petroleum 80/110 |
|---|---|---|---|---|---|---|---|---|---|---|---|---|
| 6 | 600 | 400 | " | " | 30 | 60 | 3 | 64 | 76 | 1200 | 84 | + |
| 7 | 600 | 400 | " | " | 30 | 100 | 2 | 101 | 69 | 810 | 71 | + |
| 8 | 600 | 400 | " | " | 30 | 120 | 2 | 120**) | 30 | 43 | 50 | + |
| 9 | 600 | 400 | cyclohexane | " | 30 | 80 | 3 | 45 | 96 | 110 | 106 | + |
| 10 | 700 | 300 | toluene | BF$_3$- | 20 | 60 | 3 | 78 | 30 | 17 | 133 | + |
| | oct-1-ene | | | etherate | | | | | | | | |
| 11 | 700 | 300 | " | AlCl$_3$ | 30 | 80 | 3 | 102 | 30 | 65 | 37 | + |
| | triisobutylene | | | | | | | | | | | |
| 12 | 700 | 300 | " | " | 30 | 80 | 3 | 45 | 50 | 70 | 67 | + |
| 13 | 600 | 400 | 1,2-dichloropropane | " | 30 | 80 | 3 | 47 | 35 | 50 | 120 | + |

*DCPD = dicyclopentadiene
*Dii = diisobutylene
**In this case solvent was incorporated into the product

EXAMPLE 14

150 parts of the resin produced according to Example 3 are dissolved in 150 parts of heptane and 10 parts of a nickel catalyst (53% by weight of nickel on Kieselguhr) are then added. Hydrogenation is effected under the following conditions: reaction temperature 230° C, hydrogen pressure 100 atmospheres, reaction time 5 hours. After the reaction has been completed, the mixture is cooled, the catalyst filtered off and the solvent distilled off. Finally, the mixture is heated to 200° C for a further hour in a vacuum of 50 Torr, to eliminate low molecular components. The resin obtained has the following characteristics: melting point 81° C, colour number according to Gardner 1, bromine number 5.

EXAMPLE 15

The resin produced according to Example 4 is hydrogenated under the same conditions as in Example 14 and the product has the following characteristics: melting point 67° C, colour number according to Gardner 1, bromine number 8.

EXAMPLE 16 (COMPARISON)

The resin produced according to Example 1 is hydrogenated under the same conditions as described in Example 14 and the product has the following characteristics: melting point 120° C, colour number according to Gardner 1, bromine number 10.

The following Examples serve to illustrate the preparation of adhesive compositions according to the invention:

EXAMPLES 17 to 25

Preparation of Adhesive Compositions

Mixtures of 100 parts by weight of natural rubber, 60 parts by weight of the resin of each of the Examples 1 to 5 and 20 parts by weight of a terpene phenol resin dissolved in 600 parts by weight of petroleum (boiling temperature 60°-95° C) are prepared (Examples 17 to 21). Further mixtures of 100 parts by weight of natural rubber and 80 parts by weight of the resins according to Examples 14, 15, the Comparison Example 16 and of a commercially thermically hydrogenated cyclopentadiene resin dissolved in 600 parts by weight of petroleum (boiling temperature 60° to 95° C) are likewise prepared (Examples 22 to 25).

The adhesive compositions of Examples 17 to 25 were subjected to the following adhesive tests:

Adhesive Tests

Test strips are coated as follows. A terephthalic acid polyester film is used as the carrier material. The adhesive solution is applied thereto in a wet layer 200μ thick and 15mm broad. The solvent is removed from the adhesive strips thus prepared by treatment at room temperature for 20 minutes and then at 50° C for 20 minutes. Subsequently, the test strips are stored under normal atmospheric conditions (23° C/50% humidity) for 24 hours.

To determine the resistance to peeling, strips measuring 1.5 by 10 cm of the coated film described above are rolled ten times on a cleaned steel plate with a 1 kg roller but without additional pressure, in accordance with PSTC-1 (Pressure Sensitive Tape Council). After 30 minutes, the resistance to peeling (Newton/15 mm) at an angle of 180° with an advance rate of 300 mm/minute is measured in a tearing machine.

The so-called "Rolling Ball Tack" test is carried out in accordance with PSTC-6. The apparatus consists of an inclined plane with an angle of inclination of 31°. The incline is 5 cm long. The inclined plane leads to a horizontal run-out plane made of glass, on which the adhesive strip to be tested is fastened. As the testing body, a steel ball 10 mm in diameter is used, and is rolled down the inclined plane on to the adhesive strip. The distance travelled on the test material gives a measure of the degree of tackiness.

Table 2 contains the measurements obtained.

Table 2

| Adhesive according to Example | Resistance to peeling Newton/15 mm | Rolling Ball tackiness |
|---|---|---|
| 17 +) (comparison) | 4 | 20 |
| 18 | 6 | 3 |
| 19 | 7 | 2 |
| 20 | 8 | 2 |
| 21 | 7 | 3 |
| 22 | 6 | 3 |
| 23 | 6 | 2 |
| 24 +) (comparison) | 4 | 15 |
| 25 (comparison) | 5 | 3 |

+) since the resins according to Examples 1 and 16 are only partially soluble in petroleum, they are dissolved in toluene.

The cyclopentadiene/diisobutylene copolymers according to the invention which we tested gave better results than the homopolymer of dicyclopentadiene as well relating to their resistance to peeling as well to their tackiness. In addition, they showed an improved resistance to peeling compared to the commercial thermally polymerised hydrogenated cyclopentadiene resin.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the preparation of a hydrocarbon resin having a molecular weight of 400 to 2000 which comprises polymerizing a mixture of (a) from 30 to 90% by weight of a dicyclopentadiene component comprising dicyclopentadiene and up to 30% by weight of an at most dialkylated dicyclopentadiene having from 1 to 4 carbon atoms in each alkyl substituent and (b) from 10 to 70% by weight of an aliphatic olefin containing 8 carbon atoms in the presence of a Friedel-Crafts catalyst and a solvent at a temperature of from 30° to 140° C.

2. A process as claimed in claim 1 wherein the aliphatic olefin component (b) comprises diisobutylene.

3. A process as claimed in claim 1 wherein the polymerisation is effected in the presence of from 0.5 to 6% by weight, referred to the weight of the monomer mixture, of the catalyst.

4. A process as claimed in claim 1 wherein the solvent has a water content of below 0.1% by weight and is selected from the group consisting of an aromatic hydrocarbon, a liquid halogenated hydrocarbon containing from 1 to 6 carbon atoms and an aliphatic hydrocarbon containing from 5 to 14 carbon atoms.

5. A process as claimed in claim 1 wherein the catalyst comprises a boron trifluoride etherate.

6. A process as claimed in claim 1 wherein after the polymerisation the catalyst is removed.

7. A process as claimed in claim 1 wherein the polymer obtained is subsequently hydrogenated in the presence of a metal catalyst.

8. A process as claimed in claim 7 wherein the hydrogenation is effected at a temperature of from 150° to 260° C.

9. A process as claimed in claim 7 wherein the metal catalyst comprises finely divided nickel on kieselguhr.

10. An olefinically unsaturated hydrocarbon resin having a molecular weight of from 400 to 2000, a melting point of from 20° to 140° C (by the capillary method) and a viscosity of from 10 to 5000 cP (as a 70% toluene solution at 20° C) and comprising (a) from 30 to 90% by weight of polymerised units of a dicyclopentadiene component comprising dicyclopentadiene and up to 30% by weight of an at most dialkylated dicyclopentadiene having from 1 to 4 carbon atoms in each alkyl substituent and (b) from 10 to 70% by weight of polymerised units of an aliphatic olefin containing 8 carbon atoms.

11. A resin as claimed in claim 10 containing only units of dicyclopentadiene and diisobutylene.

12. A hydrogenated hydrocarbon resin having a molecular weight of from 500 to 1500, a bromine number below 25, a melting point of from 20° to 140° C (by the capillary method) and a viscosity of from 10 to 5000 cP (as a 70% toluene solution at 20° C) and comprising (a) from 30 to 90% by weight of polymerised units of a dicyclopentadiene component comprising dicyclopentadiene and up to 30% by weight of an at most dialkylated dicyclopentadiene having from 1 to 4 carbon atoms in each alkyl substituent and (b) from 10 to 70% by weight of polymerised units of an aliphatic olefin containing 8 carbon atoms.

13. An adhesive composition comprising a hydrogenated hydrocarbon resin as claimed in claim 12 and at least one further ingredient selected from the group consisting of other resins, pigments, fillers, solvents and stabilisers.

14. A composition as claimed in claim 13 which also contains natural rubber or a synthetic rubber and from 40 to 120% by weight, referred to the rubber, of the hydrogenated hydrocarbon resin.

15. A composition as claimed in claim 13 which contains a terpene-phenol resin.

* * * * *